United States Patent [19]
Ginocchio

[11] Patent Number: 5,729,872
[45] Date of Patent: Mar. 24, 1998

[54] METHOD OF STORING BUNDLED ITEMS

[76] Inventor: Mark H. Ginocchio, Box 46555, St. Pete Beach, Fla. 33741

[21] Appl. No.: 760,461

[22] Filed: Dec. 6, 1996

[51] Int. Cl.⁶ .......................... A44B 21/00; B65D 63/00
[52] U.S. Cl. .................... 24/16 R; 24/30.5 R; 24/543
[58] Field of Search .................. 24/16 R, 30.5 R, 24/543

[56] References Cited

U.S. PATENT DOCUMENTS

| | | | |
|---|---|---|---|
| 3,310,852 | 3/1967 | Flanders | 24/16 R |
| 3,429,985 | 2/1969 | Czigler | 24/543 |
| 3,574,900 | 4/1971 | Emery | 24/130 |
| 3,654,668 | 4/1972 | Appleton . | |
| 3,910,280 | 10/1975 | Talonn | 128/327 |
| 3,953,911 | 5/1976 | Fishback | 24/16 R |
| 4,278,042 | 7/1981 | Lindquist | 114/218 |
| 4,340,998 | 7/1982 | Liberge | 23/130 |
| 4,361,938 | 12/1982 | Emery | 24/130 |
| 4,380,101 | 4/1983 | Joubert et al. | 24/237 |
| 4,650,925 | 3/1987 | Coldren | 24/543 |
| 4,669,688 | 6/1987 | Itoh et al. | 24/543 |
| 4,870,722 | 10/1989 | Shell, Jr. | 24/16 R |
| 4,956,897 | 9/1990 | Speedie | 24/134 P |
| 4,991,265 | 2/1991 | Campbell et al. | 24/16 PB |
| 5,056,248 | 10/1991 | Blanchard | 24/543 |
| 5,210,911 | 5/1993 | Brown et al. | 24/18 |
| 5,228,174 | 7/1993 | Beasley | 24/28 |
| 5,317,788 | 6/1994 | Esposito et al. | 24/300 |
| 5,349,779 | 9/1994 | Ben-Dror | 24/543 |

OTHER PUBLICATIONS

Photograph White Cable Clamp.
Photograph Rowland Clip.
Photograph of Toy Handcuffs.
Photograph Gray Cable Clamp.

Primary Examiner—Victor N. Sakran
Attorney, Agent, or Firm—Wood, Herron&Evans, LLP

[57] ABSTRACT

A method of storing bundled items such as electrical cords or cables (12) is provided by using a handcuff-like element (10) having jaws (14,16) that self-sustain an open position while the bundled item (12) is inserted therein and which traverse a fixed path or trajectory to close on the bundled item (12) to store same.

20 Claims, 2 Drawing Sheets

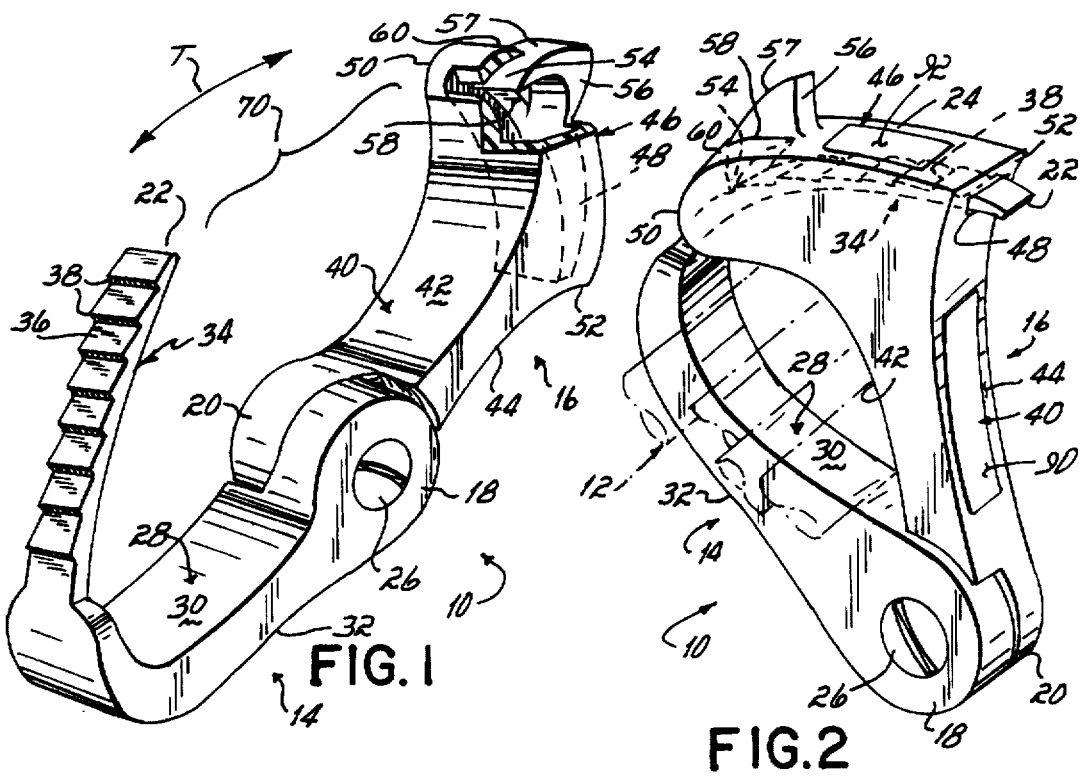
FIG. 1
FIG. 2
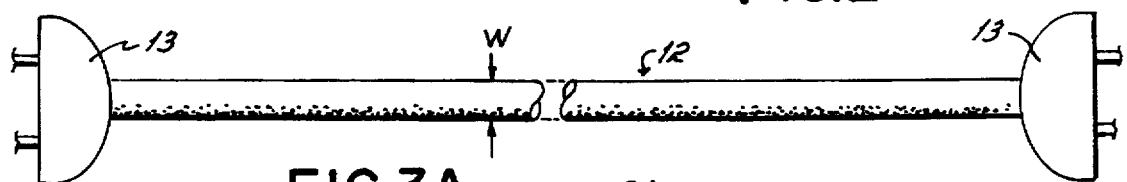
FIG. 3A
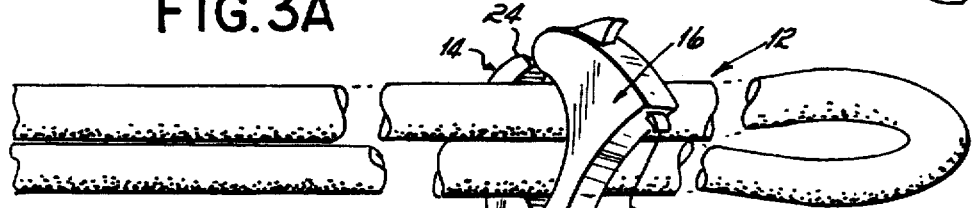
FIG. 3B
FIG. 3C
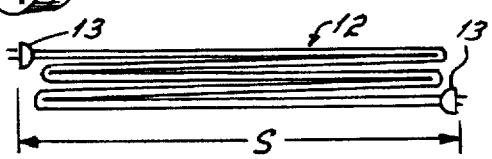
FIG. 3D
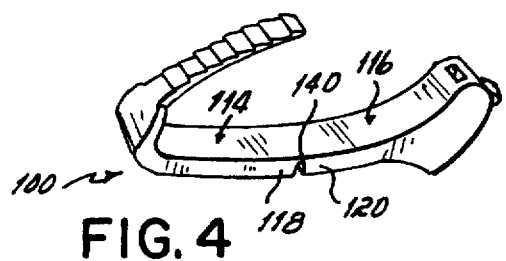
FIG. 4

METHOD OF STORING BUNDLED ITEMS

BACKGROUND OF THE INVENTION

I. Field of the Invention

The present invention relates to storage of bundled items and, more particularly, to storage of electrical cords or cables.

II. Description of Prior Art

Storage of electrical cords or cables has presented numerous challenges. Many people tend to leave their cords simply in a pile. Such an approach is both unsightly and can be unsafe. Indeed, without better organization of the cords, storage can become a nightmare. One need only consider the PC laptop user trying to untangle the mess of cables from the briefcase in a busy airport.

Typically, wire-ties, tie wraps, cable ties, or twist-ties may be used to store cords in an effort to reduce such problems. However, such items are very difficult to use and require a great deal of manual dexterity. In particular, closing these ties around the bundled cord is quite challenging because the ends are free to go wherever they are pushed. Some of those items, and particularly twist-ties such as are used to close garbage bags, are unsightly, have only a short useful life, and can present a risk of injury due to the metal wire contained therein. Other cable management devices have been proposed, but they are usually quite bulky and again require a great deal of manipulation. By way of example, some cable management devices are molded into a split ring with the ends normally urged together. The ends may be temporarily held apart by the user while a cable is inserted into the device. Such a device is difficult to load with the bundled wire because the ends are normally urged together into a closed or nearly-closed position.

SUMMARY OF THE INVENTION

The present invention provides a method of storing bundled items, such as electrical cords or cables, which overcomes the above-mentioned drawbacks. To this end, and in accordance with the principles of the present invention, bundled items are stored easily and neatly by utilizing a pair of hinged, rigid jaws which have a self-sustaining wide open position and are self-aligned so as to readily close about the bundled item. The rigid jaws may be in the form of a handcuff-like element.

These and other objects of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is a perspective, partially cut-away view of a handcuff-like element in the wide open position to receive a bundled electrical cord in accordance with the method of the present invention;

FIG. 2 is a perspective, partially cut-away view of the handcuff-like element of FIG. 1 in the closed position grasping the bundled electrical cord;

FIGS. 3A–3D are a perspective views of an elongated electrical cord being bundled for purposes of describing the method of the present invention;

FIG 4 is a perspective view of an alternative embodiment of a handcuff-like element in the method of the present invention.

DETAILED DESCRIPTION OF THE DRAWINGS

Figure 5:
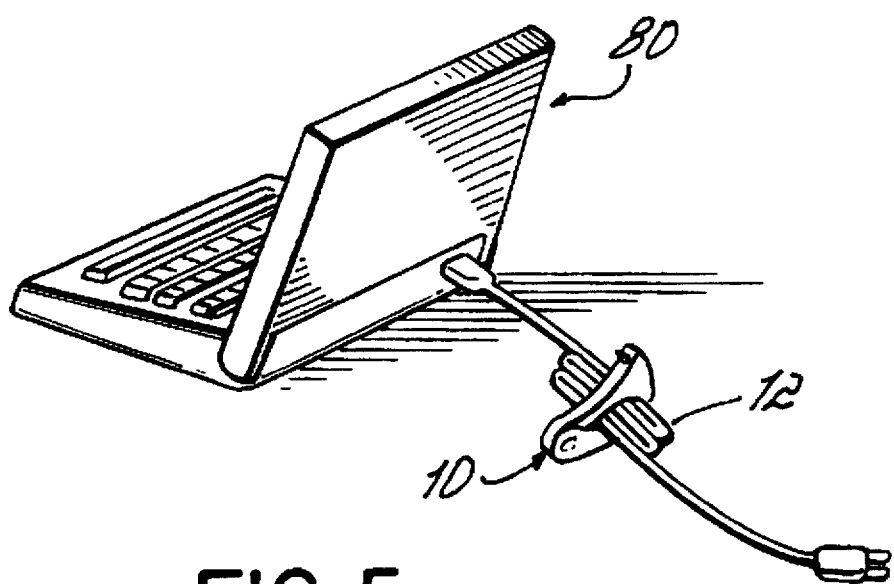
FIG. 5 is a perspective view of the handcuff-like element of FIG. 1 bundled and in use.

With reference to FIGS. 1 and 2, there is shown a handcuff-like element 10 which may be used to store an elongated item such as electrical cord or cable 12 (FIG. 3A) which may have connectors or plug elements 13 at opposite ends thereof, and which has been bundled together (FIGS. 3C and 3D). To this end, handcuff-like element 10 includes a pair of generally rigid jaw members 14, 16 each having a proximal hinge end 18, 20, respectively, and a distal attachment end 22, 24, respectively. In the embodiment shown in FIGS. 1 and 2, hinge ends 18, 20 are directly connected together by a rivet 26 which functions as an axle to allow the jaw members 14, 16 to pivot relative one another between the wide open position shown in FIG. 1 and the closed position shown in FIG. 2, as will be readily understood.

The proximal aspect 28 of jaw member 14 has an inner retaining surface 30 and an outer press surface 32 extending from hinge end 18 towards attachment end 22. The distal aspect 34 of jaw member 14 extends from proximal aspect 28 at an angle to give jaw member 14 an overall C-shape. The upper surface 36 of distal aspect 34 of jaw member 14 is serrated with teeth as at 38 for purposes to be described hereinafter. The proximal aspect 40 of jaw member 16 has an inner retaining surface 42 and an outer press surface 44 extending from hinge end 20 towards attachment end 24. The distal aspect of jaw member 16 defines a housing 46 with an arced passageway 48 extending between distal tip 50 and back ledge 52. Extending into passageway 48 is a tang 54 attached to an actuator button 56 resiliently mounted to housing 46 and extending through an aperture 58 in upper surface 60 of housing 46.

In both jaw members 14 and 16, the inner retaining surfaces 30 and 42 have a gentle arc such that in the wide-open position as shown in FIG. 1, almost the entire extent of the inner surfaces are not facing one another, except perhaps adjacent the distal aspects of the respective jaw members.

The generally rigid nature of the jaw members 14, 16, and the function of axle 26 allow the jaw members to operate in certain ways that are advantageous for storing bundled items. To this end, the wide open position shown in FIG. 1 is self-sustaining in that handcuff-like element 10 will retain that wide-open position with the attachment ends spaced well apart to define a bundle-receiving space 70 therebetween, and with the inner retaining surfaces 30 and 42 generally not facing each other as above-described. Rivet 26 pushes confronting surfaces of the hinge ends 18 and 20 together so as to maintain a frictional engagement therebetween thus holding element 10 in the open position. Similarly, the jaw members 14, 16 are self-aligned in that application of pressure to the press surfaces 32 and 44 will cause the jaw members to move together along a generally fixed path or trajectory (as indicated by double-headed arrow T) that effectively insures that attachment end 22 of jaw member 14 will be received into attachment end 24 of jaw member 16 as the jaw members 14, 16 are urged together without need for extra manipulation. As jaw members 14, 16 continue to be pushed together, attachment 22 engages with attachment end 24 in the closed position shown in FIG. 2 with the inner retaining surfaces 30 and 42 confronting one another.

To facilitate maintaining handcuff-like element 10 in the closed position as shown in FIG. 2, teeth 38, which may be backwardly directed as shown in FIG. 1, cooperate with tang 54 such that as attachment end 22 of jaw member 14 passes into passageway 48, tang 54 rides over teeth 38 and notches therein to generally prevent jaw member 14 from coming loose from attachment end 24 of jaw member 16. Actuating button 56 by pressing on surface 57 thereof causes tang 54 to momentarily lift upwardly relative passageway 48 and out of engagement with teeth 38 to allow handcuff-like element 10 to be opened.

Handcuff-like element 10 may be made of durable and resilient plastic (such as ABS), metal, or a combination of the two, all of which involve conventional materials and manufacturing techniques. Where both metal and plastic are used, the axle (e.g., rivet 26) and tang 54, for example, would be metal with the rest made of plastic.

In use, an elongated item such as an electrical cord 12 is to be stored as a bundle (i.e., with several elongated segments S in overlapped condition) with handcuff-like element 10. To this end, the thickness or width W of item 12 is to be increased many-fold (while the length thereof is greatly decreased) by bundling the item 12 in known fashion. For example, cord 12 may be folded back and forth along itself as indicated in FIGS. 3A–3D, such as by folding the cord in half (FIG. 3B) and then in half again (FIG. 3C). The folding in-half process may be repeated as desired until the cord 12 is a bundle as preferred by the user. Alternatively, short lengths or segments S of cord 12 may be folded over and over into a bundle as exemplified by FIG. 3D, or cord 12 may be coiled around the hand or fingers and then pressed together with the same result. As a consequence, there is formed a bundle having a bundled width $W_B$ many times (e.g., at least 2 although advantageously at least 4 to 8 or more) greater than width W. Bundled cord 12 may be attached to a useable device such as a PC 80 as in FIG. 5, either before or after being bundled, and either before or after being clamped as will now be described.

Jaw members 14, 16 are spread apart into the self-sustaining open position shown in FIG. 1 whereat no further pressure is needed by the user on jaw members 14 or 16 to retain the open position. While handcuff-like element 10 is in that self-sustained open position, the bundle (such as bundled cord 12 of FIG. 3C or FIG. 3D) is inserted into handcuff-like element 10 through bundle-receiving space 70, either by pushing the bundle into element 10, or by passing open element 10 over the bundle. Thereafter, pressure is applied against press surfaces 32 and 44 in conventional fashion to cause jaw members 14; 16 to engage at their attachment ends 22, 24, until inner retaining surfaces 30 and 42 have grasped against bundled item 12 as shown in dotted line in FIG. 2. The bundled cord 12 is thus held in a small compact bundle, even while in use as in FIG. 5, with easy manipulation of a handcuff-like element and without difficult-to-use and unsightly items as provided in the prior art.

Additionally, surfaces 32, 44, and/or 46 are relatively wide and so may be labelled with indicia (as at 90 or 92). These indicia bearing surfaces may be provided with labels bearing advertisements, directions or indicators of the product being clamped (e.g., Christmas lights, extension cord, PC cable, etc.). The labelling may be permanent or temporary and may be applied by embossing, hot stamping, pad printing, stickers, or handwritten with marker.

With reference to FIG. 4, an alternative embodiment of a handcuff-like element 100 is shown which may be used in the method of the present invention. To this end, jaw members 114, 116 are like jaw members 14, 16 except that hinge ends 118 and 120 are not connected together by an axle, but instead are connected together by a hinge strap 140. Handcuff-like element 100 (including hinge strap 140) may be made of the same plastic as handcuff-like element 10 but with less plastic in the hinge strap 140 so that it may bend when jaw members 114 and 116 are pivoted together into the closed position (like that shown in FIG. 2). Alternatively, hinge strap 140 could be made from a different grade or type of plastic. In that instance, a rotational press (not shown) may be used wherein two different types or grades of plastic are simultaneously injected into the same cavity at two different points to make an integral product. In this way, most of handcuff-like element 100 may be made of durable and resilient plastic, while hinge strap 140 is made of a more flexible plastic. The resiliency/flexibility of strap 140 tends to force jaw members 114, 116 into the open position such that handcuff-like element 100 tends to automatically assume the open position (like FIG. 1) when it is not closed. Operation of handcuff-like element 100 is otherwise substantially identical to that of handcuff-like element 10.

While the present invention has been illustrated by the description of embodiments of the invention, and while the embodiments have been described in considerable detail, it is not the intention of applicant to restrict or in any way limit the scope of the appended claims to such detail. Additional advantages and modifications will readily appear to those skilled in the art. By way of example, although the bundled item (12) is shown as a single elongated item folded over upon itself, it will be appreciated that a bundle could alternatively refer to a plurality of separate, typically elongated items held together as a bundle. Consequently, whether multiple overlying segments of one item define the bundle or multiple items define the bundle, each of which would appear as in FIG. 2, the result is a bundle that has a width or thickness substantially greater than any one item in the bundle. Additionally, various structural changes are possible. For example, serrated teeth and the tang may be replaced with other cooperating latch elements as will be apparent. Similarly, less pronounced, or a different number of teeth may be employed. So, too, rivet 26 may be replaced with a screw or self attaching clip or the like. In the element 100, hinge strap 140 may be formed by ultrasonically welding jaw members 114, 116 together at their hinge ends. Further, handcuff-like element 10 may be provided with a spring loaded hinge and/or locking device (both not shown) to assist in keeping the jaw members 14, 16 in the open position without external pressure as is accomplished with hinge strap 140 of element 100. The invention in its broader aspects is therefore not limited to the specific details, representative apparatus and methods, and illustrative examples shown and described. Accordingly, departures may be made from such details without departing from the spirit or scope of applicant's general inventive concept.

Having described the invention, what is claimed is:

1. A method of storing a bundle comprising:
   bundling at least one item such that the width of the bundle is substantially greater than the width of any one item in the bundle;
   providing first and second generally rigid jaw members each having a hinge end and an attachment end, each jaw member including an inner retaining surface and an outer press surface extending between the ends of the jaw member, the attachment end of the first jaw member having a latch element, the attachment end of the second jaw having a latch element configured to mate with the latch element of the first jaw member at a plurality of positions, the hinge ends of the jaw members having complementary recesses, the jaw members being connected together at their hinge ends with said complementary recesses aligned, such that the jaw members (i) have a first, self-sustaining open position in which the attachment ends are spaced well apart to define a bundle-receiving space and the inner retaining surfaces are generally not facing one another whereby the bundle may pass into and between the jaw members without requiring external pressure to maintain the jaw members in the open position, (ii) have a second, closed position in which the attachment ends are engaged and the inner retaining surfaces are in confronting relationship, and (iii) are self-aligned such that the attachment ends automatically engage together upon applying pressure on the outer press surfaces;

placing the jaw members into the open position;

passing the bundle through the bundle-receiving space in the open position; and placing the jaw members into the closed position with the bundle therein by applying pressure on the outer press surfaces of the jaw members until the inner retaining surfaces grasp against the bundle, and the latch elements of the jaw members self-align and mate together at a desired one of the plurality of positions.

2. The method of claim 1 including bundling only one item.

3. The method of claim 2 wherein the item is an electric cord and bundling the item includes wrapping the cord back and forth along itself a plurality of times to form said bundle.

4. The method of claim 1 including bundling a plurality of items.

5. The method of claim 1 further comprising connecting the jaw member hinge ends together with an axle.

6. The method of claim 1 further comprising connecting the jaw member hinge ends together with a hinge strap.

7. The method of claim 1 wherein at least one jaw member has an indicia surface, the method further comprising applying a label to the indicia surface.

8. The method of claim 1 wherein said latch elements form a releasable connection, and further comprising releasing said latch elements of the jaw members, placing the jaw members into the open position, and removing the bundle through the bundle receiving space in the open position.

9. The method of claim 1 wherein said attachment end of said first jaw member has a passageway, said attachment end of said second jaw member being configured to pass into the passageway of the first jaw member to facilitate self-alignment of said attachment ends.

10. The method of claim 9 wherein said latch element on said second jaw member comprises teeth formed on said second jaw member, and said latch element on said first jaw member comprises a tang formed on said second jaw member and passing into said passageway for engagement to the teeth of the first jaw member, said tang being hingedly connected to said first jaw member to permit disengagement of said tang from the teeth of the first jaw member.

11. A method of using a handcuff-like element for storing a bundle, the handcuff-like element having first and second generally rigid jaws, each jaw having a hinge end and an attachment end with an inner retaining surface and an outer press surface extending between the ends of the jaw, the attachment end of the first jaw having a latch element, the attachment end of the second jaw having a latch element configured to mate with the latch element of the first jaw at a plurality of positions, the hinge ends having complementary recesses, the jaws being connected together at their hinge ends with said complementary recesses aligned, such that the handcuff-like element (i) has a first, self-sustaining open position in which the attachment ends are spaced well apart with the inner retaining surfaces generally not facing one another, (ii) has a second, closed position in which the attachment ends are engaged and the inner retaining surfaces are in confronting relationship, and (iii) jaws are self-aligned such that the attachment ends automatically engage together upon applying pressure on the outer press surfaces, the method comprising:

bundling at least one item such that the width of the bundle is substantially greater than the width of any one item in the bundle;

placing the jaws of the handcuff-like element into the open position whereby that position is sustained without requiring external pressure to the jaws;

passing the bundle through a space defined between the attachment ends in the open position of the handcuff-like element; and placing the handcuff-like element into the closed position with the bundle therein by applying pressure on the outer press surfaces of the jaws until the latch elements of the jaw members self-align and mate together at a position of the plurality of positions where the inner retaining surfaces grasp against the bundle.

12. The method of claim 11 including bundling only one item.

13. The method of claim 12 wherein the item is an electric cord and bundling the item includes wrapping the cord back and forth along itself a plurality of times to form said bundle.

14. The method of claim 11 including bundling a plurality of items.

15. The method of claim 11 further comprising connecting the jaw member hinge ends together with an axle.

16. The method of claim 11 further comprising connecting the jaw member hinge ends together with a hinge strap.

17. The method of claim 11 wherein at least one jaw member has an indicia surface, the method further comprising applying a label to the indicia surface.

18. The method of claim 11 wherein said latch elements form a releasable connection, and further comprising releasing said latch elements of the jaws, placing the jaws into the open position, and removing the bundle through the bundle receiving space in the open position.

19. The method of claim 11 wherein said attachment end of said first jaw member has a passageway, said attachment end of said second jaw member being configured to pass into the passageway of the first jaw member to facilitate self-alignment of said attachment ends.

20. The method of claim 19 wherein said latch element on said second jaws comprises teeth formed on said second jaw, and said latch element on said first jaw comprises a tang formed on said second jaw and passing into said passageway for engagement to the teeth of the first jaw, said tang being hingedly connected to said first jaw to permit disengagement of said tang from the teeth of the first jaw.

* * * * *

UNITED STATES PATENT AND TRADEMARK OFFICE
CERTIFICATE OF CORRECTION

PATENT NO.   : 5,729,872

DATED        : March 24, 1998

INVENTOR(S)  : Mark Ginocchio

It is certified that error appears in the above-identified patent and that said Letters Patent is hereby corrected as shown below:

Column 1, line 20, delete "dosing", insert --closing--.

Column 2, line 2, after "element", insert --for use--.

Column 2, line 21, after "understood.", insert --Hinge ends 18, 20 further include complementary recesses.--.

Column 4, line 3, before "are", insert --, which include complementary recesses,--.

Column 4, line 20, deleted "dosed", insert --closed--.

Column 6, line 58, Claim 20, delete "second jaws", insert --second jaw--.

Signed and Sealed this

Eleventh Day of May, 1999

Attest:

Q. TODD DICKINSON

*Attesting Officer*  *Acting Commissioner of Patents and Trademarks*

(12) EX PARTE REEXAMINATION CERTIFICATE (7250th)
United States Patent
Ginocchio

(10) Number: US 5,729,872 C1
(45) Certificate Issued: Dec. 22, 2009

(54) METHOD OF STORING BUNDLED ITEMS

(76) Inventor: Mark H. Ginocchio, Box 46555, St. Pete Beach, FL (US) 33741

Reexamination Request:
No. 90/010,306, Oct. 7, 2008

Reexamination Certificate for:
| | |
|---|---|
| Patent No.: | 5,729,872 |
| Issued: | Mar. 24, 1998 |
| Appl. No.: | 08/760,461 |
| Filed: | Dec. 6, 1996 |

Certificate of Correction issued May 11, 1999.

(51) Int. Cl.
*A44B 21/00* (2006.01)
*B65D 63/00* (2006.01)

(52) U.S. Cl. .......... 24/16 R; 24/30.5 R; 24/543
(58) Field of Classification Search .......... 24/16 R, 24/30.5 R, 543
See application file for complete search history.

(56) References Cited

U.S. PATENT DOCUMENTS

| | | | |
|---|---|---|---|
| 766,263 A | 8/1904 | Judd | |
| 930,014 A | 8/1909 | Wood | |
| 3,429,985 A | 2/1969 | Czigler | |
| 3,530,543 A | 9/1970 | Desmarais et al. | |
| 3,660,869 A | 5/1972 | Cavaney et al. | |
| 4,123,095 A | 10/1978 | Stehlin | |
| 4,483,556 A | 11/1984 | Livolsi | |
| 4,511,164 A | 4/1985 | Orchard | |
| 4,958,791 A | 9/1990 | Nakamura | |
| 5,056,248 A | * 10/1991 | Blanchard | 40/322 |
| 5,083,741 A | 1/1992 | Sancoff | |
| 5,293,669 A | 3/1994 | Sampson | |
| 5,363,538 A | * 11/1994 | Arrendiell et al. | 24/499 |
| 5,677,513 A | 10/1997 | Ito et al. | |
| 6,619,077 B1 | 9/2003 | Robinson | |
| 6,742,223 B1 | 6/2004 | Chang | |

FOREIGN PATENT DOCUMENTS

| | | |
|---|---|---|
| GB | 758160 | 10/1956 |
| GB | 1 224 535 | 3/1971 |
| GB | 2 139 016 | 4/1984 |
| GB | 2 245 639 | 1/1992 |
| JP | 56-9681 | 7/1954 |
| JP | 60-87485 | 6/1985 |
| JP | 60-177050 | 11/1985 |
| JP | 5-32824 | 4/1993 |
| JP | 5-55864 | 5/1993 |
| JP | 5-83924 | 11/1993 |
| JP | 5-85078 | 11/1993 |
| JP | 3001914 | 6/1994 |
| JP | 7122135 | 10/1997 |
| JP | 34-1164 | 8/2009 |

OTHER PUBLICATIONS

Japanese Abstract, JP7122135, Sumitomo Wiring Syst Ltd, May 12, 1995.

* cited by examiner

*Primary Examiner*—Jimmy G Foster

(57) ABSTRACT

A method of storing bundled items such as electrical cords or cables (12) is provided by using a handcuff-like element (10) having jaws (14,16) that self-sustain an open position while the bundled item (12) is inserted therein and which traverse a fixed path or trajectory to close on the bundled item (12) to store same.

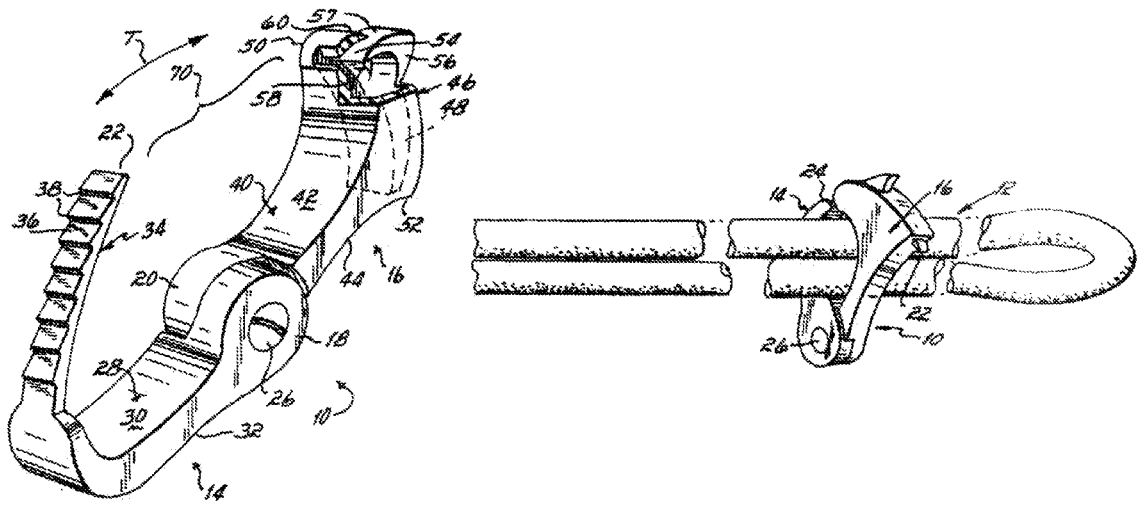

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–20 is confirmed.

New claims 21–28 are added and determined to be patentable.

*21. The method of claim 1 wherein said latch elements are releasable by pressure upon a surface of one said jaw member.*

*22. The method of claim 21 further comprising applying pressure to said surface to release said latch elements and place the jaw members into the open position.*

*23. The method of claim 1 wherein said jaw members are frictionally engaged at their attachment ends such that the jaw members will be held in the self-sustaining open position.*

*24. The method of claim 23 wherein the step of applying pressure on the outer press surfaces overcomes frictional engagement between said jaw members.*

*25. The method of claim 11 wherein said latch elements are releasable by pressure upon a surface of one said jaw member.*

*26. The method of claim 25 further comprising applying pressure to said surface to release said latch elements and place the jaw members into the open position.*

*27. The method of claim 11 wherein said jaw members are frictionally engaged at their attachment ends such that the jaw members will be held in the self-sustaining open position.*

*28. The method of claim 27 wherein the step of applying pressure on the outer press surfaces overcomes frictional engagement between said jaw members.*

\* \* \* \* \*